United States Patent
Wisner et al.

[11] Patent Number: 5,720,463
[45] Date of Patent: Feb. 24, 1998

[54] AUTOMOTIVE SEAT RAIL MECHANISM

[75] Inventors: Donald W. Wisner, Grand Haven; Erik J. Denslow, Spring Lake, both of Mich.

[73] Assignee: Track Corp., Grand Haven, Mich.

[21] Appl. No.: 519,571

[22] Filed: Aug. 25, 1995

[51] Int. Cl.$^6$ ............................................. F16M 13/00
[52] U.S. Cl. ............................................. 248/429
[58] Field of Search .................... 248/419, 420, 248/429, 430; 297/344.1, 344.14; 384/42

[56] References Cited

U.S. PATENT DOCUMENTS

| | | | |
|---|---|---|---|
| 2,609,029 | 9/1952 | Haberstump | 248/419 X |
| 3,066,907 | 12/1962 | Latimer et al. | 248/420 |
| 4,720,073 | 1/1988 | Mann et al. | 248/419 X |
| 5,323,998 | 6/1994 | Aihara | 248/419 X |
| 5,342,013 | 8/1994 | Ito et al. | 248/429 |
| 5,370,350 | 12/1994 | Okano et al. | 248/420 X |
| 5,447,352 | 9/1995 | Ito et al. | 248/429 X |
| 5,473,958 | 12/1995 | Jeck et al. | 248/429 X |

Primary Examiner—Ramon O. Ramirez
Assistant Examiner—Richard M. Smith
Attorney, Agent, or Firm—Warner Norcross & Judd

[57] ABSTRACT

An automotive vehicle seat assembly having an extruded outer rail that interlocks with the inner rail. In cross section, the outer rail is generally C-shaped with a pair of internal flanges. The flanges interlock with portions of the inner rail to provide improved structural integrity for both the inner and outer rails.

5 Claims, 1 Drawing Sheet

AUTOMOTIVE SEAT RAIL MECHANISM

BACKGROUND OF THE INVENTION

The present invention relates to automotive seating, and more particularly to a rail mechanism for an automotive vehicle seat.

An automotive seat assembly includes a seat frame mounted on a seat rail mechanism. The rail mechanism allows the seat to move forward and backward with respect to the floor. A typical rail mechanism includes slidably interfitted inner and outer rails. The outer rail is secured to a vehicle component (e.g. the floor or a pedestal), and the inner rail supports the seat frame.

FIG. 1 is a cross sectional view of a conventional rail mechanism 10'. Both the outer and inner rails 12' and 14' are generally C-shaped in cross section. The inner rails includes a mounting portion 16' to which the seat frame is attached. The inner and outer rails are typically manufactured from steel using conventional transfer systems in which the stock is stamped and rolled to form the desired cross section. A pair of conventional glides 15' are located between the inner and outer rails to improve movement of the rails.

The automotive industry is continually searching for ways to reduce the cost and weight of automotive components. Even incremental reductions in either the weight or cost of a component can result in significant fuel and other operational savings over the life of an automobile. Within this context, virtually all components, including seat real mechanisms, are considered "too heavy."

SUMMARY OF THE INVENTION

The aforementioned problems are overcome by the present invention wherein the outer rail is extruded with internal flanges that interlock with the inner rail. The flanges extend into the two opposite interior portions of the inner rail so that each rail provides improved support for the opposite rail. Preferably, the outer rail is extruded from an aluminum alloy to be both light weight and inexpensive.

These and other objects, advantages, and features of the invention will be more readily understood and appreciated by reference to the detailed description of the preferred embodiment and the drawings.

DETAILED DESCRIPTION OF THE PREFERRED EMBODIMENT

Figures 1, 2, 3, 4:
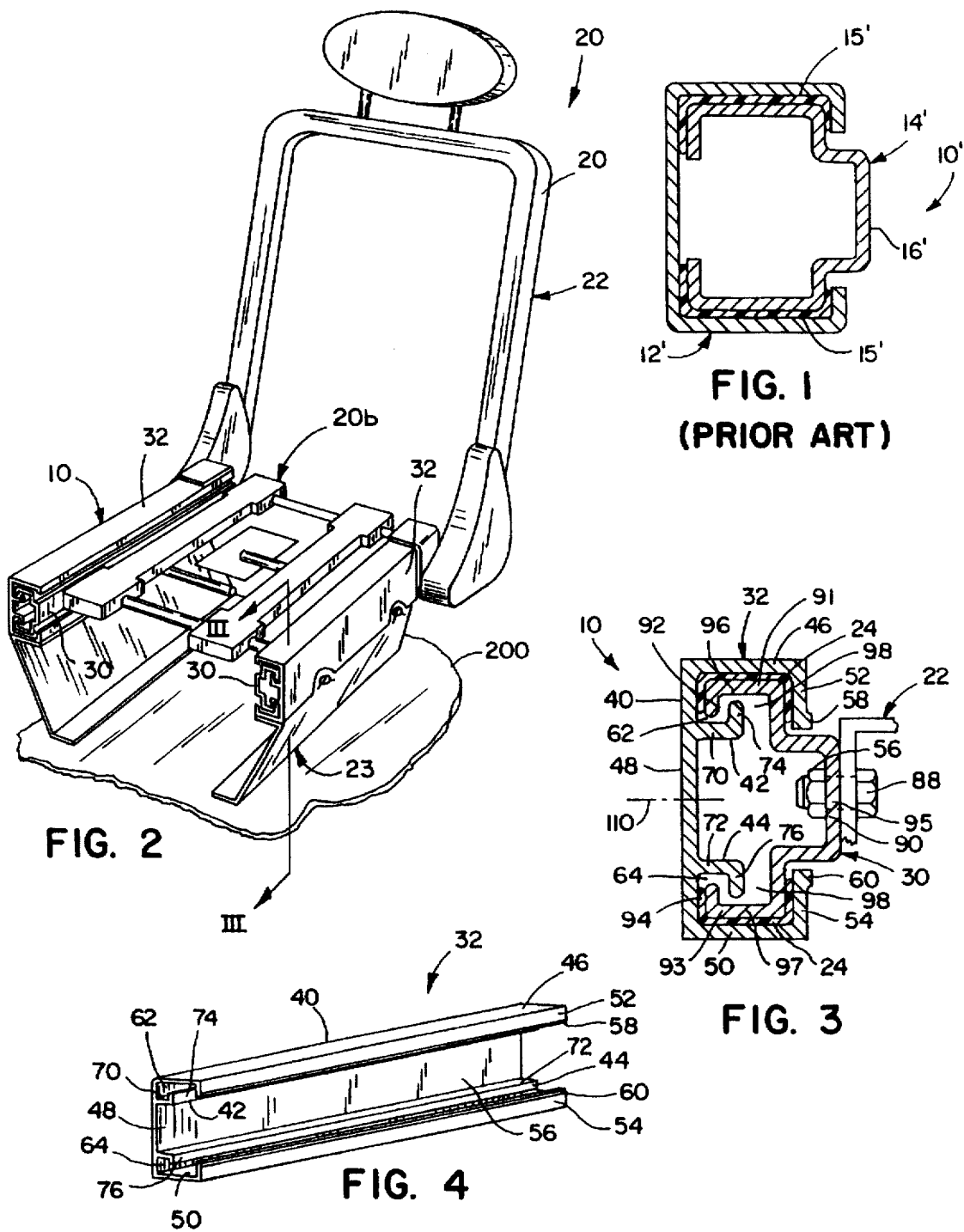
FIG. 1 is an end view of a prior art seat rail mechanism.
FIG. 2 is a perspective view of an automotive seat assembly incorporating the rail mechanism of the present invention.
FIG. 3 is an end view of the rail mechanism taken along line III—III of FIG. 2.
FIG. 4 is a perspective view of the outer rail.

A seat assembly incorporating a preferred embodiment of the present invention is illustrated in FIG. 2 and generally designated 20. The seat assembly 20 generally includes a conventional seat frame 22 mounted on a rail mechanism 10. The rail mechanism 10 is secured to the floor 200 of the vehicle, either directly (not shown) or indirectly through a conventional seat pedestal 23.

The seat frame 22 is generally well known to those skilled in the art and consequently will not be discussed in detail. Suffice it to say that the frame includes a seat portion 20b and a back portion 20a. Typically, the back portion reclines with respect to the seat portion. Often, seat actuators or drive motors (not illustrated) are mounted to the seat portion 20b and/or back portion 20a to adjust seat height, seat angle, recliner angle, lumbar support, and the like.

Although not shown, the seat assembly includes appropriate springs, supports, cushions, upholstery, and/or fabric as is customary in the art.

As shown in FIG. 3, the rail mechanism 10 includes slidably interfitted inner and outer rails 30 and 32 which move with respect to each other to allow forward and backward movement of the seat frame 22 with respect to floor 200. As noted above, the outer rail 32 is rigidly secured to a vehicle component (e.g. the floor or the seat pedestal 23) and remains stationary, while the inner rail 30 slides linearly within the outer rail 32.

The inner rail 30 is conventional and is symmetric about a horizontal plane 110 bisecting the rail. The rail 30 includes a generally C-shaped mounting portion 90, which extends out from within the outer rail 32. The mounting surface 90 defines holes 95 to receive seat mounting bolts 88, which secure the seat frame 22 to the mounting portion. Vertical load bearing portions 91 and 93 are generally J-shaped and extend from opposite sides of the mounting portion 90 and terminate in lips 92 and 94, respectively. Each J-shaped vertical load bearing portion defines a channel 98.

A pair of glides 24 are located or seated between the inner and outer rails 30 and 32 to improve or facilitate smooth movement of the rails. As shown in FIG. 3, the glides 24 are shaped to fit within the outer rail. The glides 24 are manufactured from a conventional low friction material, such as nylon, using conventional techniques.

Referring now to FIGS. 3 and 4, the outer rail 32 is an extrusion having a generally C-shaped outer wall 40 and a pair of generally L-shaped internal flanges 42 and 44. The outer rail 32 is symmetric about a horizontal plane 110 bisecting the rail. The outer wall 40 includes three closed planar sides 46, 48, and 50 and a fourth open side defined by lips 52 and 54. The lips 52 and 54 extend toward each other to define a slot 56, which closely receives the mounting portion 90 of the inner rail 30. Lateral ribs 58 and 60 extend along lips 52 and 54 to bolster the outer rail 32.

Outer rail internal flanges 42 and 44 extend inwardly from side 48 to form a pair of symmetric channels 62 and 64 into which lips 92 and 94 extend. Both flanges 42, 44 are generally L-shaped and include first 70 and 72 and second 74 and 76 legs extending at right angle to each other. As illustrated, leg 74 extends upwardly from leg 70 toward side 46 and leg 76 extends downwardly from leg 72 toward side 50. Channels 62 and 64 closely receive lips 92 and 94, respectively, and the glides The interlocking structure of the rail mechanism 10 enhances the structural integrity of both rails 30 and 32, which structurally support one another. Improved integrity is important both in normal operation and in vehicle accidents, when the rails are subjected to large forces.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A rail mechanism for an automobile seat assembly, comprising:

an inner rail having an outer wall and a pair of spaced apart lips; and an outer rail generally C-shaped in cross section defining an interior, said inner rail slidably received within said interior of said outer rail, said outer rail including an outer wall at least partially surrounding and slidably interfitting with said outer wall of said inner rail, said outer rail including a pair of substantially L-shaped flanges extending from said outer wall into said interior and interlocking with said lips of said inner rail, said outer rail having a symmetric cross section.

2. The rail mechanism of claim 1, wherein said outer rail is a one-piece extrusion.

3. An automotive seat rail mechanism comprising:

an outer rail having an outer wall generally C-shaped in cross section defining an interior and including a first wall defining a mouth and a second wall opposite said first wall, and a pair of flanges extending from said second wall into said interior, each of said flanges being substantially L-shaped, said flanges cooperating with said second wall to define a pair of channels, said channels opening away from each other, said flanges and said outer wall being integral portions of a single extrusion, said outer wall and said flanges symmetric about a plane bisecting said outer rail; and an inner rail slidably interfitted with said outer wall of said outer rail, said inner rail having a pair of lips each uniquely associated with and extending into one of said channels to interlock said inner rail and said outer rail.

4. The rail mechanism of claim 3 wherein said outer wall includes closed planar side walls extending between said first and second walls.

5. A rail mechanism for movably mounting a vehicle seat within a vehicle, the mechanism comprising:

an inner rail having a mounting portion and a pair of vertical load bearing portions; and a one-piece, extruded outer rail slidably interfitted with said inner rail, said outer rail having a generally C-shaped outer wall and a pair of flanges from said outer wall toward said inner rail, said outer wall including three closed planar sides and a fourth open side defined by a pair of lips, said flanges defining a pair of channels slidably receiving said vertical load bearing portions, said outer wall at least partially surrounding said inner rail and defining a mouth, said mounting portion located within said mouth, said flanges interlocking with said vertical load bearing portions of said inner rail, said outer rail having a symmetric cross section.

* * * * *

UNITED STATES PATENT AND TRADEMARK OFFICE
CERTIFICATE OF CORRECTION

PATENT NO. : 5,720,463
DATED : February 24, 1998
INVENTOR(S) : Wisner et al

It is certified that error appears in the above-indentified patent and that said Letters Patent is hereby corrected as shown below:

Column 3, Claim 3, Line 17:
    "wail" should be --wall--

Signed and Sealed this

Second Day of June, 1998

Attest:

BRUCE LEHMAN

Attesting Officer

Commissioner of Patents and Trademarks